W. W. WILLIAMS.
CUFF PIN.
APPLICATION FILED DEC. 1, 1911.
1,066,352.
Patented July 1, 1913.
2 SHEETS—SHEET 1.
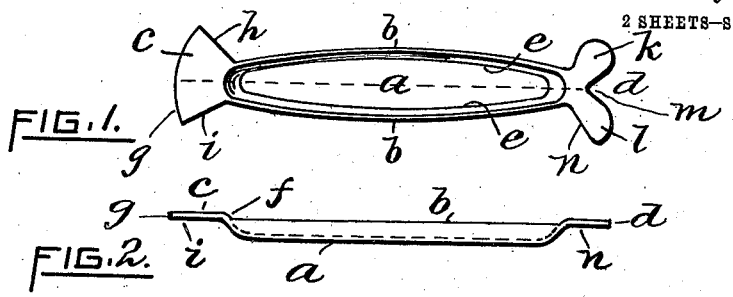
FIG. 1.
FIG. 2.
FIG. 4.
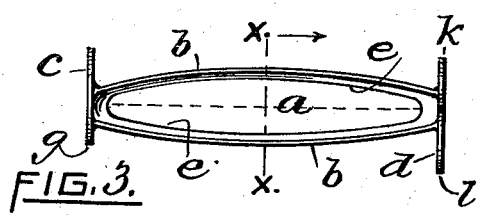
FIG. 3.
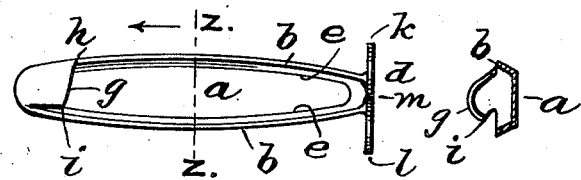
FIG. 5.   FIG. 6.
FIG. 8.   FIG. 7.
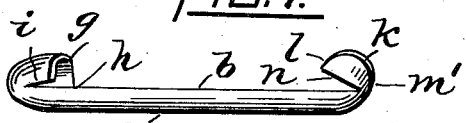
FIG. 9.
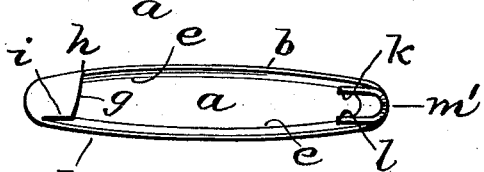
FIG. 10.
WITNESSES:
Warren R. Perce
Annie E. Perce
INVENTOR:
Wade W. Williams W. W. WILLIAMS.
CUFF PIN.
APPLICATION FILED DEC. 1, 1911.
1,066,352.
Patented July 1, 1913.
2 SHEETS—SHEET 2.
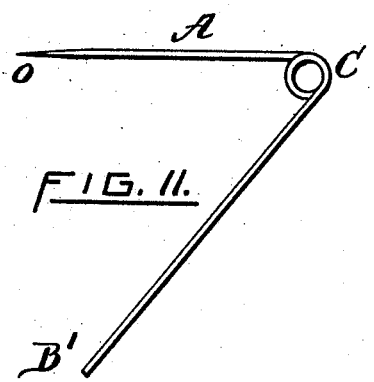
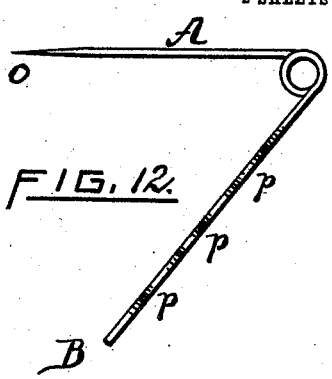
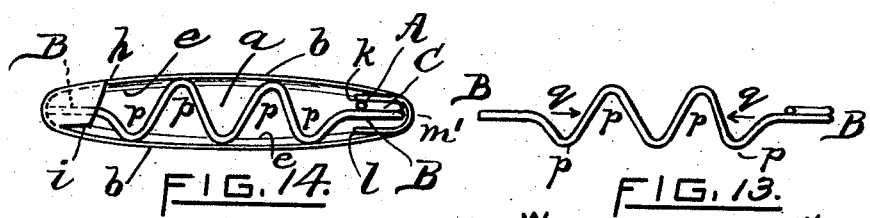
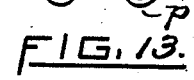
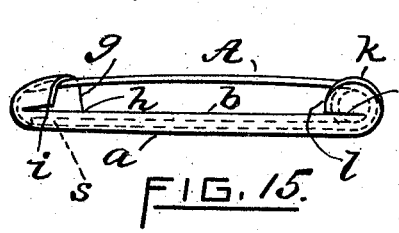
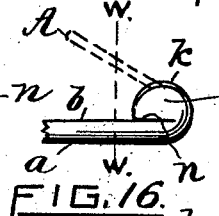
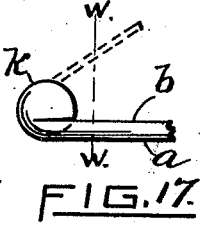
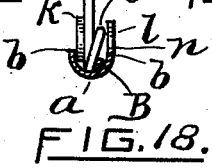
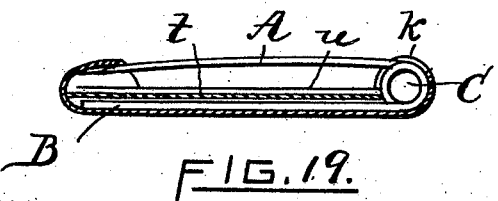
WITNESSES:
Warren R. Perce
Annie E. Perce.
INVENTOR:
Wade W. Williams

UNITED STATES PATENT OFFICE.

WADE W. WILLIAMS, OF PROVIDENCE, RHODE ISLAND.

CUFF-PIN.

1,066,352.  Specification of Letters Patent.  Patented July 1, 1913.

Application filed December 1, 1911. Serial No. 663,377.

*To all whom it may concern:*

Be it known that I, WADE W. WILLIAMS, a citizen of the United States, residing at Providence, in the county of Providence and State of Rhode Island, have invented certain new and useful Improvements in Cuff-Pins, of which the following is a specification, reference being had therein to the accompanying drawing.

My invention relates to cuff pins and the details of their construction, as specified in the claims.

In the accompanying drawings like reference letters indicate like parts.

Figure 1 is a top plan view of the cupped blank from which my improved cuff pin is developed. Fig. 2 is a front elevation of said blank. Fig. 3 is a top plan view of the blank after its two terminals have been bent up, parallel to each other, at right angles to the major diameter of the blank. Fig. 4 is a view partly in elevation and partly in cross section as seen on the line $x\ x$ of Fig. 2, the terminal therein shown being the hinge-joint member before the same has been shaped to form the U-bend hereinafter described. Fig. 5 is a top plan view of the blank after the other terminal has been bent to form the pin catch. Fig. 6 is a view, partly in elevation and partly in cross section on the line $z\ z$ of Fig. 5, and shows the form of the pin catch as seen on such section line in the direction of the arrows in Fig. 5. Fig. 7 is a front elevation of the cuff pin body exhibited in Fig. 5, and shows the side of the pin catch where the pointed end of the pin tongue enters to engage therewith. Fig. 8 is a rear elevation of the pin catch and the adjacent portion of the cuff pin body and shows the closed side of the pin catch. Fig. 9 is a front elevation of the cuff pin body represented in Fig. 7, after the hinge-joint member has been bent into a U-shape, but is only partially bent into its final form. Fig. 10 is a top plan view of the cuff pin body of Fig. 9. Fig. 11 is a side elevation of the pin tongue, presser foot and intermediate coil, all formed of a single piece of wire. Fig. 12 is a side elevation of the pin tongue, presser foot and coil after the presser foot has been formed into a series of approximately V-shaped bends. Fig. 13 is a plan view of the presser foot after it has been so bent. Fig. 14 is a top plan view of the cuff pin body represented in Fig. 10, after the said presser foot and coil have been placed in operative position within the concavity of the cuff pin body. Fig. 15 is a front elevation of the completed cuff pin as seen when the pin tongue is engaged in the pin catch, the presser foot and coil being shown in dotted lines. Fig. 16 is an elevation of the winged portion of the hinge-member and the adjacent part of the cuff pin body in the final form of the invention. Fig. 17 is an elevation of the rear portion of the hinge-member and the adjacent part of the cuff pin body in the final form of the invention. Fig. 18 is a view, partly in elevation and partly in cross section on lines $w\ w$ of Figs. 16 and 17, and shows the pin tongue and coil in elevation in their operative position, together with the front portion of the hinge-member and the rear portion of the hinge-member, said rear portion serving as a wedge as hereinafter described. Fig. 19 shows in central longitudinal section the body of the cuff pin with a lining plate therein overlying the presser foot, and the flanges of the body rolled over upon the lining plate. In this view the presser foot, coil and pin tongue are shown in elevation.

The blank illustrated in Fig. 1 is formed and cut by a cutter, die and plunger from sheet metal in the usual manner, and comprises, in a single piece, the bottom $a$, the bent-up flange $b$, curved as shown or formed into any other desired shape or curvature, and the two terminals $c$ and $d$. The inner elliptical line $e$ in Figs. 1, 3, 5, 10 and 14, indicates the outer boundary of the bottom $a$. The dotted line in Fig. 2 represents the inner surface of the bottom $a$. The terminal $c$ has a bent neck portion $f$, an arc-shaped periphery $g$ and two radially disposed straight edges $h$ and $i$. The radial edges $h$ and $i$ are substantially of equal length, but the outer end of said edge $h$ is farther distant from the median longitudinal dotted line in Fig. 1 than is the outer end of the edge $i$. The terminal $c$ has the general outline of an opened fan. The terminal $d$ has the neck portion $j$ and the general outline of a maple-key (one wing $k$ of which, however, is slightly more curved and wider than the other wing $l$) with a central reëntering curve $m$. One edge $n$ of the wing $l$ is straight. The two terminals $c$ and $d$ are first bent, as shown in Fig. 3, to extend parallel with each other, at right angles to the longitudinal (dotted) diameter in Fig. 3.

The terminal c is developed into a pin catch, as shown in Figs. 5 and 6, having a general hooded shape. The radial edge h is bent into proximity or contact with the adjacent portion of the flange b, as best seen in Fig. 8, and the radial edge i is bent to form a slot of diverging edges, as seen in Figs. 5, 6, 7, 9, 10, 14 and 15. This slot allows the pointed end of the pin tongue to enter within the pin catch to engage therewith. The terminal d is developed into a hinge-member, as shown in Figs. 9, 10, 14, 15, 16, 17 and 18. The inwardly curved portion m of Figs. 1 and 4 is bent into a U-shape, as illustrated at m' in Figs. 10 and 14, so that the wings k and l extend substantially parallel with each other.

The pin tongue is shown at A in Fig. 11 and is made of tempered wire. It has a pointed end o. The presser foot B is integral with the pin tongue A, and a spiral coil C, integral with the pin tongue A and presser foot B, extends between them, preferably comprising one and one-half coils, although, if desired it may have more coils, or even a half-coil only. The pressed foot B has a series of quite sharp bends p p, practically all in the same plane with the straight ends, as shown in Fig. 13.

The coiled end C is inserted into the U-shaped hinge-member k l of Figs. 9, 10 and 14, whereupon said hinge-member is bent into operative position. By pliers or other suitable tool, the entire hinge-member is bent over so that the wings k l thereof extend parallel with each other, until the straight edge n comes into proximity with the adjacent straight edge of the flange b, as seen in Figs. 15, 16 and 18, and the arc-shaped portion k of the hinge-member shuts down in contact with the inner surface of the adjacent portion of the flange b, as seen in dotted lines in Fig. 17 and in solid lines in Fig. 18. Thus, the portion l of the hinge-member lies in close supporting contact with the adjacent flat (or outside) surface of the coil C, as plainly indicated in Fig. 18, and the portion k of the hinge member lies in close supporting contact with the opposite flat (or outside) surface of the coil C, as also indicated in Fig. 18. Therefore the portion k of the hinge-member has a wedge action, and by bearing against the adjacent inner surface of the flange b of the cuff pin body forces the coil C into firm contact with the inner surfaces of both the portions k and l of the hinge-member. In this hinge-member a pivot is not needed. The coil C bears laterally against the inner surfaces of the parts k and l and thus permits a limited oscillation of the pin tongue A in only one plane. The coil C cannot rise out of its seat in said hinge-member because such movement is prevented by the final bend of the hinge-member, already described. This bending so changes the curvature that the coil C is sufficiently overlaid by the bend m' as to prevent the rise of the coil C out of its proper position in the hinge-member. However, this bending or curvature would alone be not sufficient to keep the coil C in a successfully operative position, except by a coöperative function of the presser foot B. This function of the presser foot and the construction which enables such result are set forth only briefly in this specification, because the peculiar shape, combination, construction and operation of the pin tongue, coil and presser foot constitute the subject matter of an application herewith filed, being Serial No. 663,378.

The presser foot, B, being made of tempered metal and having a series of diagonal, alternately-directed, or zigzag bends p p, is capable of being shortened lengthwise by the use of pliers, or other appropriate implement. When the tool is applied to the bends p p as at q q in Fig. 13, and force is exerted in the directions indicated by the arrows in said figure, the length of the presser foot, while the compression continues, is shortened. The outer end of the presser foot is then inserted within the body portion beneath pin catch, as shown by dotted lines in Figs. 14 and 15, and the coiled end is inserted in the hinge-member, when the latter is in the position illustrated in Figs. 9 and 10. Then, when the tool is disengaged therefrom, the resilience of the presser foot causes it to expand and lengthen to its normal dimensions. In this manner its free end presses with great force, in an endwise direction, against the inner surface of the pin catch, and, at the same time, in like manner, the outer edge of the coil C is pressed against the inner surface of the bend m' of the hinge-member. The bends p p of the presser foot B are also useful to prevent any lateral rocking movement of the presser foot in the body of the cuff pin. Any other lateral extensions of the presser foot may be made thereon for this same purpose. By the curvature of the pin catch and of the hinge-member the normal resilient expansion of the bends p p of the presser foot the pin tongue coil, and presser foot are confined in position, yet allowing the oscillation of the pin tongue A in one plane from its open position, shown in dotted lines in Figs. 16 and 17, to its closed position shown in Fig. 15. If it is desired, however, to insure further the fixed position of the outer end of the presser foot within the pin catch, that end of the presser foot can be soldered to the inner surface of the cuff pin body at or near the place marked s in Fig. 15.

It is evident that the crimping, crinkling, or other bending of the presser foot B may be dispensed with, and the same may extend straight from end to end, but being either soldered, as above suggested, or made a little longer than the internal major diameter of the cuff pin body, and therefore it can be slightly bowed lengthwise in order to engage its ends against the inner surface of the body portion beneath, respectively, the pin catch and hinge-member and so obtain the requisite end-thrust, or spring pressure.

If desired, a lining plate $t$ may be provided to cover and conceal the presser foot B and the inner surface of the body of the cuff pin, and also to protect the same and prevent the accumulation of lint, or other foreign matter. If such a lining plate is used, the edges of the flange $b$, on both sides of the cuff pin, between the hinge-member and the pin catch should be rolled over upon the lining plate, as shown at $u$ in Fig. 19, and for this purpose the flange $b$ must be made of sufficient width to allow the formation of a rolled edge thereon.

I claim as a new and useful invention and desire to secure by Letters Patent:—

1. In a cuff-pin, the combination of a body portion; a pin catch; a pin tongue having a coil at one end and a point at the opposite end, said point being engageable with the pin catch; and a hinge-member integral with the body portion and shaped as a hood in supporting contact with the outer edge of the coil and with the two flat sides of the coil, and having one portion of said hinge-member in wedging position between one flat side of the coil and the adjacent part of the body portion.

2. In a cuff pin, the combination of a body portion having on each of two opposite sides a flange, whose edge is straight; a pin catch at one end of the body portion; a tempered pin tongue engageable with the inner surface of the body portion beneath the pin catch and having a presser foot and a coil formed with one and one-half spiral turns between the pin tongue and presser foot and integral with them and which presser foot abuts the inner surface of the body portion beneath the pin catch; and a U-shaped hinge-member at the opposite end of the body portion and integral therewith, bent into partial covering contact with the outer edge of the coil, one branch of the U-bend being thereby brought substantially into alinement with the adjacent straight edge of the body portion into lateral contact with one flat side of the coil and the other branch of said bend being wedged into position against the other flat side of the coil and against the inner side of the adjacent portion of the edge of the body portion.

3. In a cuff pin, the combination of a body portion; a pin catch; a pin tongue having a spiral coil and a presser foot, all integral; and a hinge-member integral with said body portion and adapted to hold the coil and in contact with the coil on the opposite sides thereof, one portion of which hinge-member is wedged between the inner surface of the side of said body portion and the adjacent side of the coil and which presser foot has a spring end-pressure against the inner surface of the body portion beneath the pin catch and which coil has a spring end-pressure against the inner surface of the body portion beneath the hinge-member.

In testimony whereof I affix my signature in presence of two witnesses.

WADE W. WILLIAMS.

Witnesses:
WARREN R. PERCE,
ANNIE E. PERCE.

---

Copies of this patent may be obtained for five cents each, by addressing the "Commissioner of Patents, Washington, D. C."